United States Patent [19]
Van Lerberghe

[11] Patent Number: 5,991,167
[45] Date of Patent: Nov. 23, 1999

[54] DC TO DC POWER CONVERTER INCLUDING SYNCHRONOUS OUTPUT RECTIFIER CIRCUIT

[75] Inventor: Steven J. W. Van Lerberghe, Eindhoven, Netherlands

[73] Assignee: U.S. Philips Corporation, New York, N.Y.

[21] Appl. No.: 09/038,566

[22] Filed: Mar. 11, 1998

[30] Foreign Application Priority Data

Mar. 12, 1997 [EP] European Pat. Off. .............. 97400546

[51] Int. Cl.⁶ .................................................. H02M 3/335
[52] U.S. Cl. ............................ 363/16; 363/127; 363/131; 363/89
[58] Field of Search ................................ 363/16, 17, 127, 363/131, 89

[56] References Cited

U.S. PATENT DOCUMENTS

| | | | |
|---|---|---|---|
| 4,814,962 | 3/1989 | Magalhaes | 363/16 |
| 5,159,541 | 10/1992 | Jain | 363/26 |
| 5,438,497 | 8/1995 | Jain | 363/17 |

FOREIGN PATENT DOCUMENTS

3300669C2  5/1984  Germany.

*Primary Examiner*—Shawn Riley
*Attorney, Agent, or Firm*—Jack D. Slobod

[57] ABSTRACT

A DC to DC power converter which can suitably be used, for example, in a charger device for rechargeable batteries has an input and a load output, a resonant transformer provided with a transformer input and a transducer output coupled to the load output, an output rectifier circuit coupled to the load output, a controllable transformer control circuit, in the form of a pulse providing circuit, coupled between the input of the converter and the transformer input, and a synchronous output rectifier circuit coupled between the transformer output and the load output. The transformer control circuit receives a control signal derived from a signal constituting or proportional a signal at the transformer output. The output rectifier circuit shows a variety of possible embodiments, each embodiment including at least two transistor switches which are connected between a different end of the transformer output and a same end of the load output.

14 Claims, 9 Drawing Sheets

FIG. 12

DC TO DC POWER CONVERTER INCLUDING SYNCHRONOUS OUTPUT RECTIFIER CIRCUIT

BACKGROUND OF THE INVENTION

1. Field of the Invention

The present invention relates to a DC to DC power converter having an input and a load output, the converter comprising a resonant transformer provided with a transformer input and a transformer output coupled to the load output, an output rectifier circuit coupled to the load output, and a transformer control means coupled between the input of the converter and the transformer input. The present invention also relates to a power supply and a battery charger which are provided with such a converter.

2. Description Of the Related Art

Such a converter is known from DE-C-33 00 669 which discloses a converter utilized applied in a DC current power supply. The known converter comprises a resonant transformer in the form of a resonant piezo-electric transformer whose input impedance is connected to a transformer control means in the form of a self-oscillating pulse providing means which provides pulses at a pulse rate which is equal to the resonant frequency of the resonant transformer. An input converter AC voltage is rectified and stabilized and then fed to the resonant transformer through the self-oscillating pulse providing means. The transformer output of the resonant transformer is connected to the output rectifier circuit and a voltage stabilizer circuit to provide a high performance output power at the load output of the converter which is virtually independent of the open or short circuit state of the load. In particular, the known converter provides an alternately operated parallel arrangement of two piezo-electric transformer for enhancing the availability of the output power on the load means. A disadvantage of the known converter is that its flexibility in terms of variability and arrangement of the converter as a whole and the output rectifier circuit in particular is limited.

SUMMARY OF THE INVENTION

Therefore, it is an object of the present invention to provide a power converter whose embodiment and properties can be easily adapted to a practically required range of applications.

To achieve this, the converter according to the invention is characterized in that the transformer control means is a controllable transformer control means. The converter according to the invention has the advantage that by using controllable transformer control means, the stability and the statistical spread of the properties of the converter are enhanced because they are no longer largely dependent on the input impedance of the piezo-electric transformer means, which input impedance shows a great statistical spread in practice. Furthermore, it is determined that variations which are important in practical applications of the converter according to the invention are very easy to implement. In particular, the converter according to the invention can be easily made suitable, in a variety of possible embodiments, for application, for example, in a fast battery charger.

These and other aspects of the invention will be apparent from and elucidated with reference to the embodiments described hereinafter.

DETAILED DESCRIPTION OF THE PREFERRED EMBODIMENT

Figure 1:
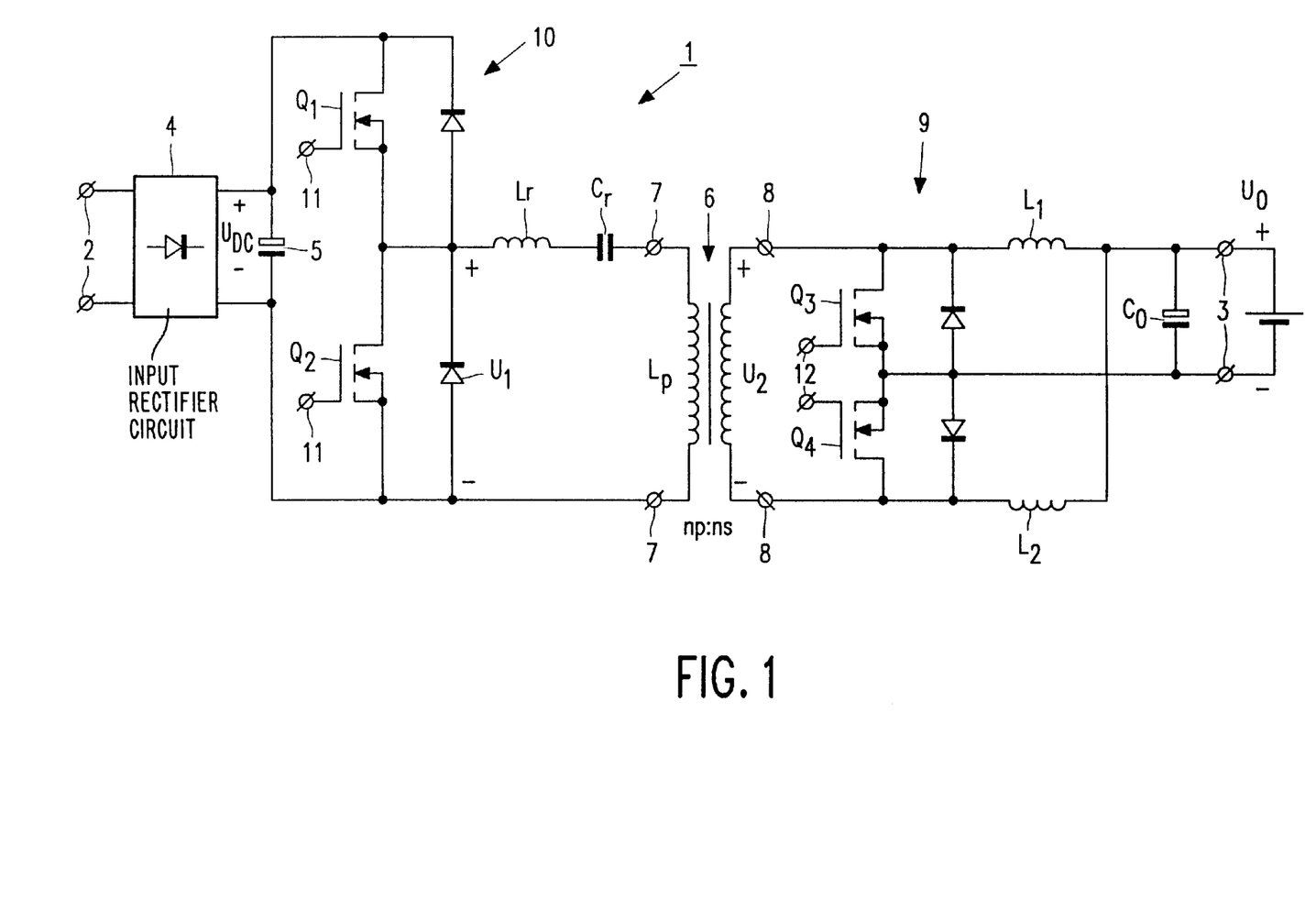
FIG. 1 shows a first embodiment of the converter according to the invention.

FIG. 1 shows an outline of a first embodiment of a converter 1. The converter 1 has an input 2 and a load output 3. The converter 1 comprises an input rectifier circuit 4, whereto a voltage stabilizing capacitor 5 is connected. The converter 1 further comprises a resonant transformer 6 provided with a transformer input 7 and a transformer output 8 coupled to the load output 3 by means of an output rectifier circuit 9. A transformer control means 10 included in the converter 1 is coupled between the input 2 of the converter and the transformer input 7. The transformer circuit control means 10 is a pulse providing circuit which is controllable via a control input 11. The control input 11 is connected to control a series arrangement of current doublers formed by transistor switches Q1 and Q2, which are also referred to as current mirrors. The output rectifier circuit 9 can supply a control signal to a control input/output 12 thereof and comprises a synchronous rectifier arrangement of current doublers formed by transistor switches Q3 and Q4. The various diodes connected in parallel to Q1, Q2, Q3 and Q4 only allow substantial voltages to be present across these diodes if the diodes do not conduct current. The output rectifier circuit 9 is connected through a smoothing coil pair L1 and L2 to a stabilizing capacitor C0 connected to the load output 3 of the converter 1. The converter comprises an LC circuit Lr, Cr coupled between the transformer control means 10 and the resonant transformer 6.

Figure 2:
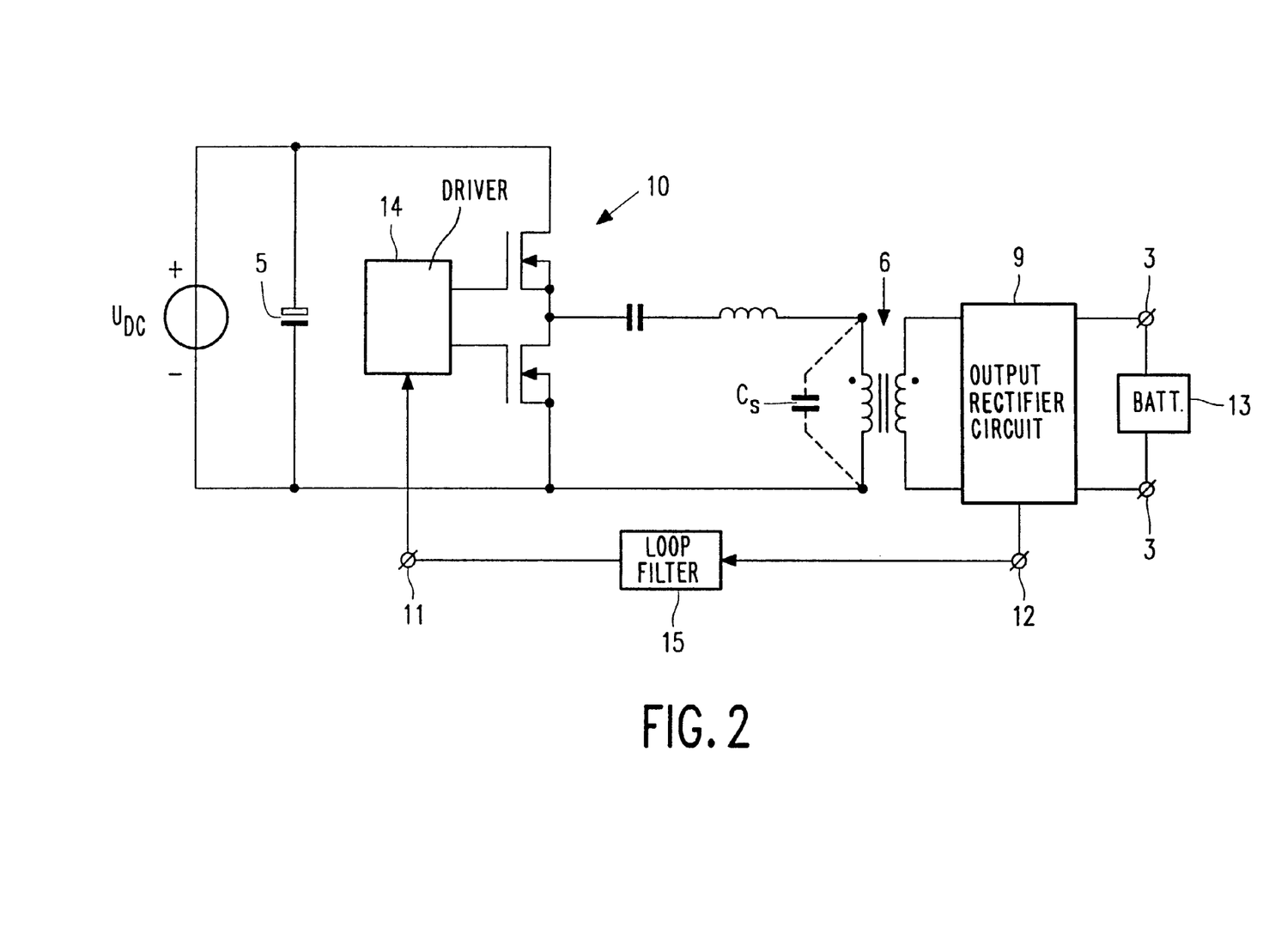
FIG. 2 shows a general outline of the converter of FIG. 1 applied in a battery charger of a power supply.

FIG. 2 shows a possible loop configuration in a general outline of the converter 1 applied in a battery charger, wherein a battery 13 is connected to the load output 3. Apart from a driver 14, a loop filter 15 is connected between control output 12 and control input 11. An alternative to the LC circuit is shown wherein an additional capacitor Cs is connected in parallel to the resonant transformer.

Figure 12:
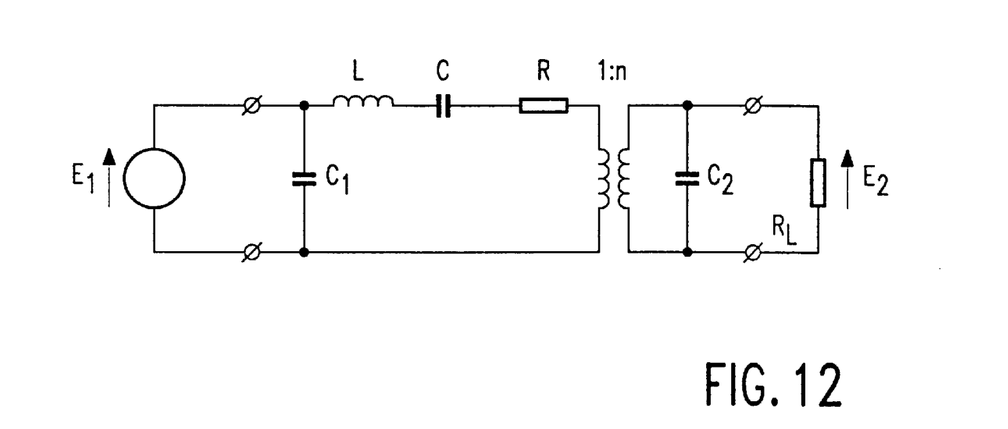
FIG. 12 shows an equivalent circuit of a piezo electric transformer.

In general, the resonant transformer may be embodied as a resonant miniature electromagnetic transformer 6, such as a well-known planar transformer realized by lithographic patterning for example, on a multilayer printed circuit board, also known as a switched mode power supply, but a piezo-electric transformer can be applied as well. A piezo-electric transformer or piezo coupler is used in DE-C-33 00 669 mentioned hereinabove. For the sake of completeness, an equivalent circuit for such a piezo-electric transformer which can suitably be incorporated in any of the embodiments described herein, is shown in FIG. 12.

The operation of the converter 1 is such that after rectifying and stabilizing an AC signal on input 2, control input 11 is controlled such that in a resonant rate ranging mostly between 50 KHz and 250 KHz, a mainly pulse shaped signal is applied to the resonant transformer means 6 and that the pulse shaped signal on transformer output 8 is again rectified by the active output rectifier circuit 9 and then DC stabilized and fed to the load, which can be any device capable of receiving the output power provided, such as a capacitor or the battery 13. As the converter 1 is capable of outputting large amounts of current, the load could also be constructed as a high power or high current load, such as a high power capacitor or a traction battery. In such an application of the converter 1, safety means could be limited to a minimum, while the volume occupied by said converter is also limited to a minimum.

Figure 3:
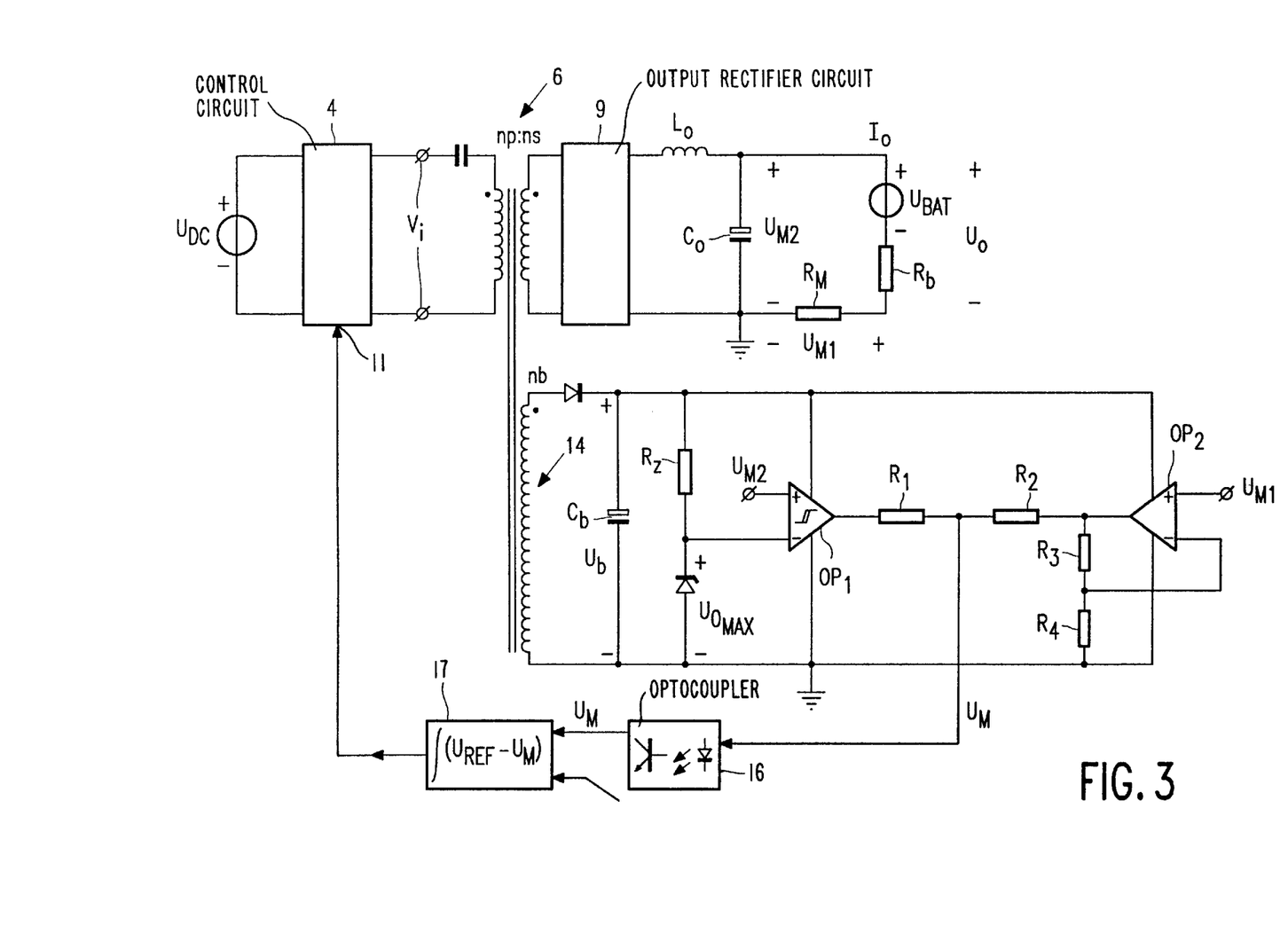
FIG. 3 shows a second embodiment of the converter of FIGS. 1 and 2, FIGS. 4, 5, 6 and 7 show possible embodiments of an output rectifier circuit for application in the converter of FIGS. 1 and 2.

FIG. 3 shows a rather detailed connection scheme wherein the control signal on input 11 is derived from the resonant transformer means 6 by means of an additional transformer coupling 14 therein. After some basic thresholding executed by means of operational amplifiers OP1 and OP2, optocoupling in optocoupler 16 for optimal isolation between input 2 and output 3, integration in integrator 17, a control signal is applied to control input 11 to control the rate to allow it to correspond with the resonance frequency of the transformer 6.

Dependent on, for example, the requirements imposed by the type of load 13, several embodiments of the output rectifier circuit 9 can be realized. FIGS. 4, 5, 6 and 7, as well as 9, 10 and 11 show examples thereof.

Figure 4:
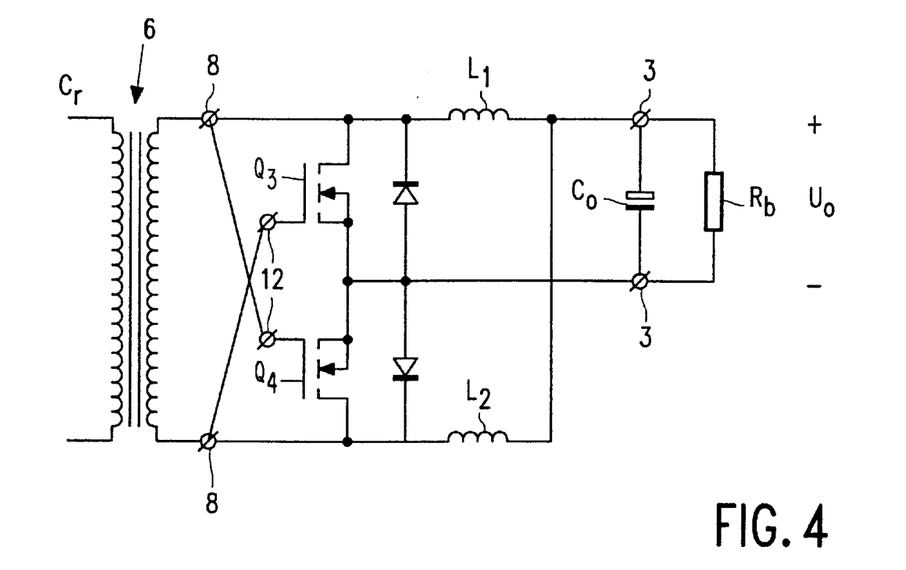

The embodiment of FIG. 4 shows a self-driven current doubler synchronous rectifier configuration of Q3 and Q4. In this example, input/output 12 is crosswise connected to transformer output 8 to be self-driven. Again, either Q3 or Q4 block the RF frequency pulses to the smoothing coils L1 and L2.

Figure 5:
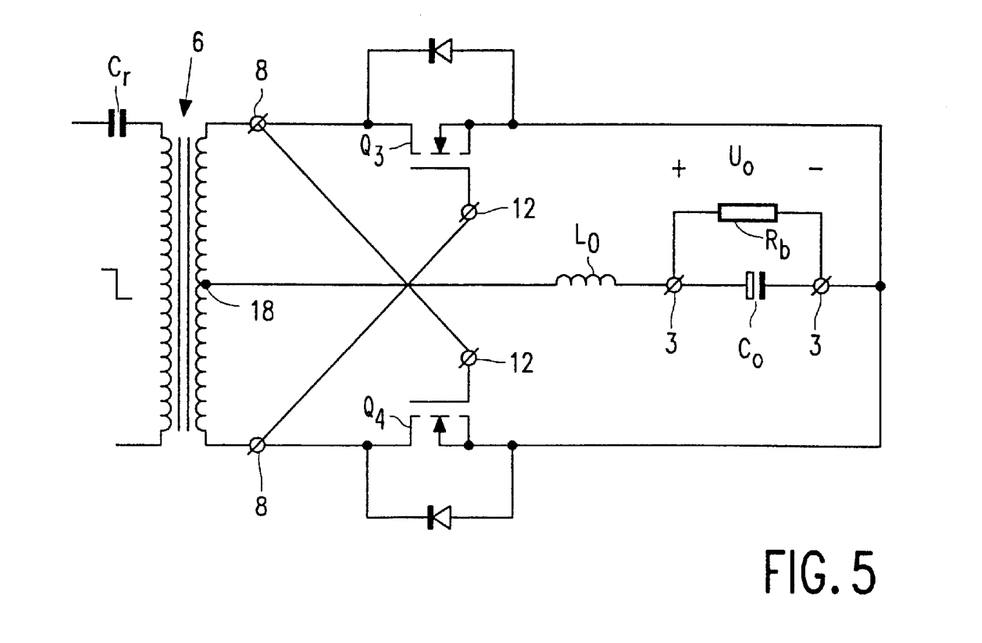

Another embodiment of the output rectifier circuit 9, wherein the resonant transformer means 6 has a central shunt or tap 18 is shown in FIG. 5. The central shunt 18 is connected to just one coil Lo. The circuit 9 now functions as a self-driven full wave synchronous rectifier.

Figure 6:
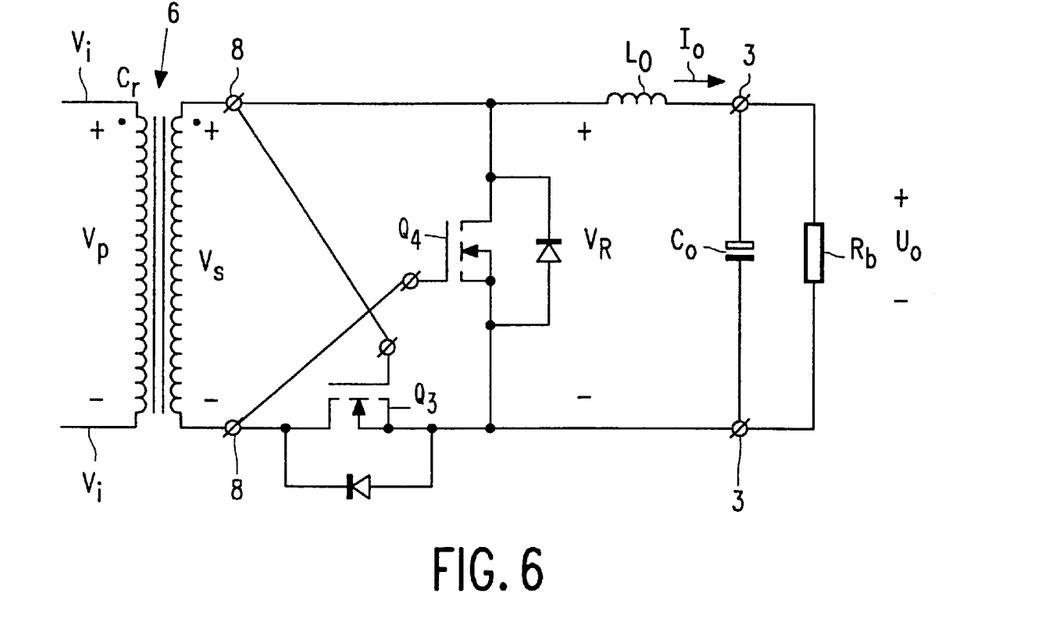
Figure 7:
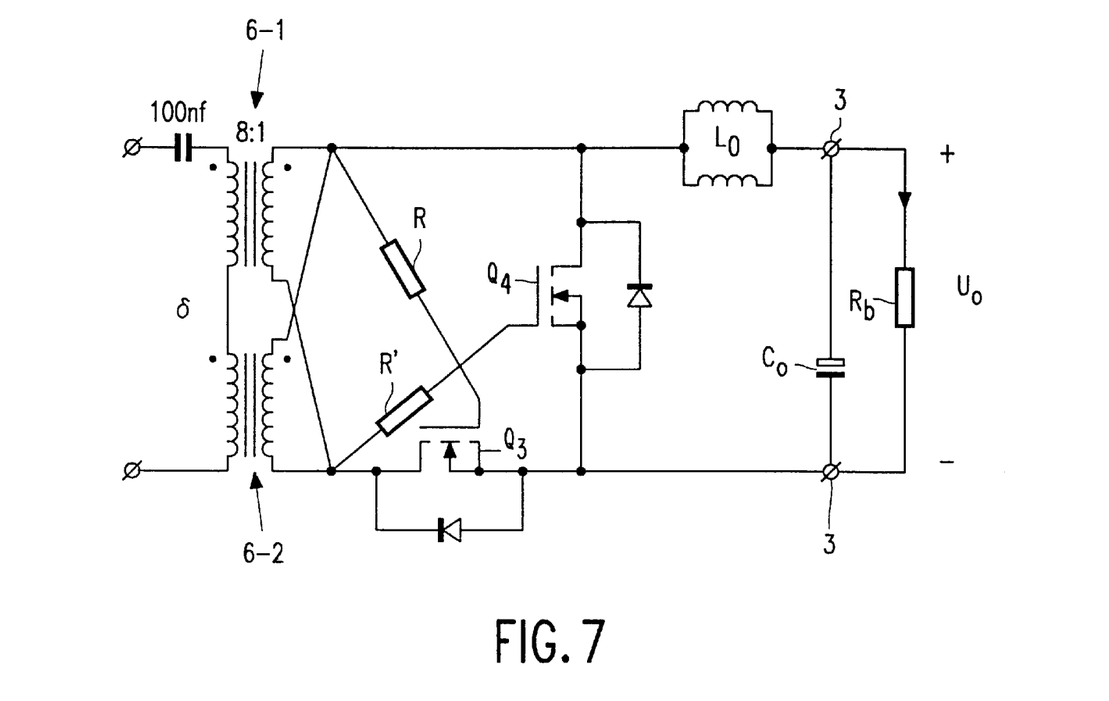
Figure 8:
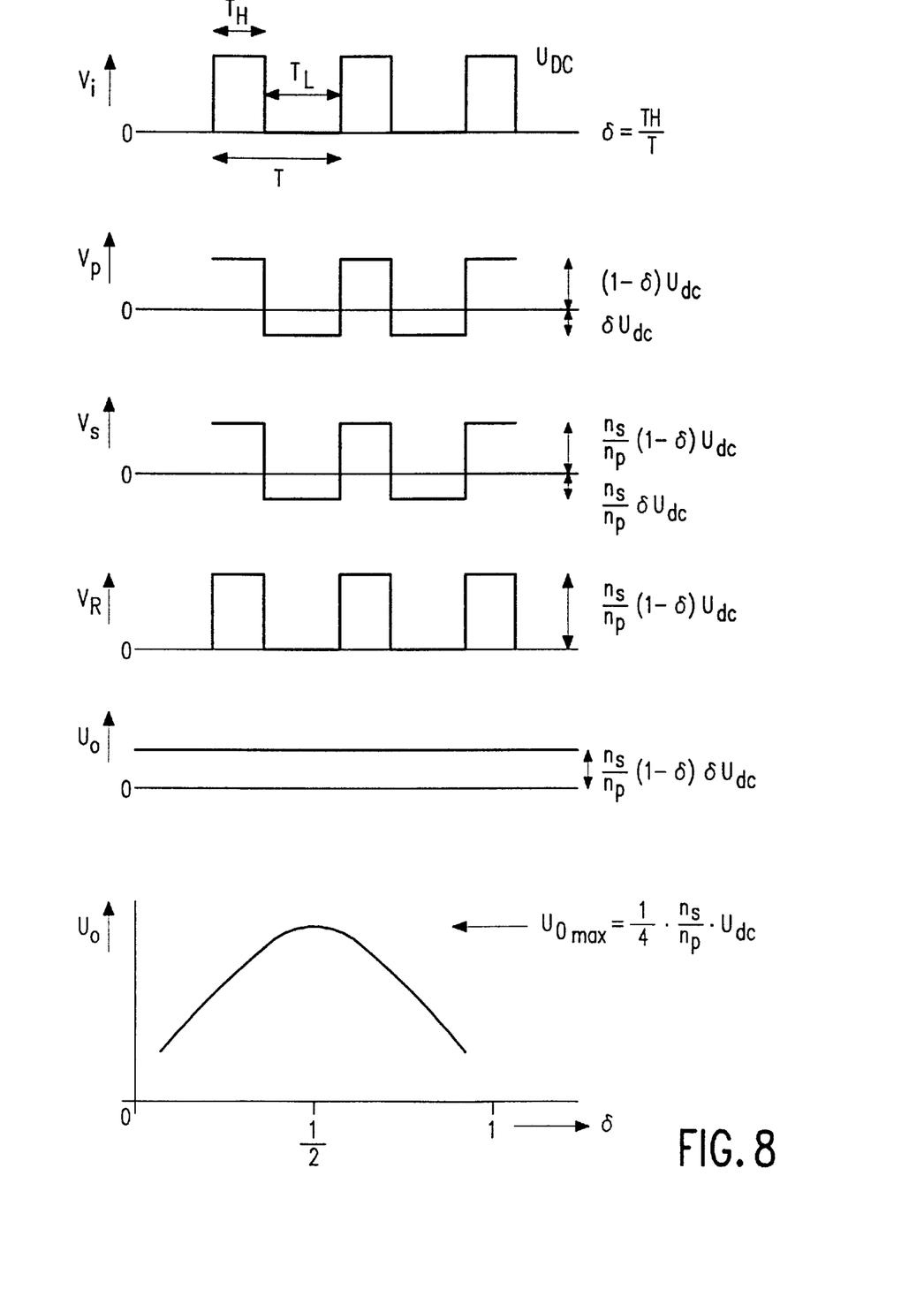
FIG. 8 shows interrelated diagrams of voltages and voltage ratios applying to the embodiment of FIG. 6, FIGS. 9, 10, and 11 show further possible embodiments of relevant parts of the converter according to the invention.

Self-driven half-wave synchronous rectifier circuits are also shown in FIGS. 6 and 7. The embodiment of FIG. 6 needs no central shunt, whereas in the embodiment of FIG. 7, two separate resonant transformers 6-1 and 6-2 are used. The voltages in FIG. 6, denoted Vi, Vp, Vs, Vr, Uo and Udc (see FIG. 3) are also shown in FIG. 8 to illustrate, by way of example, the functioning of this embodiment of circuit 9. Assuming that $n_p$: $n_s$ is the transformer transformation ratio and $\delta = T_H$: T, then the calculated values of the upper and lower peak values of the denoted voltages are as indicated in FIG. 8. For $\delta = 1/2$, the DC load voltage Uo reaches it maximum $(n_s/4*n_p)$ Udc.

Figure 9:
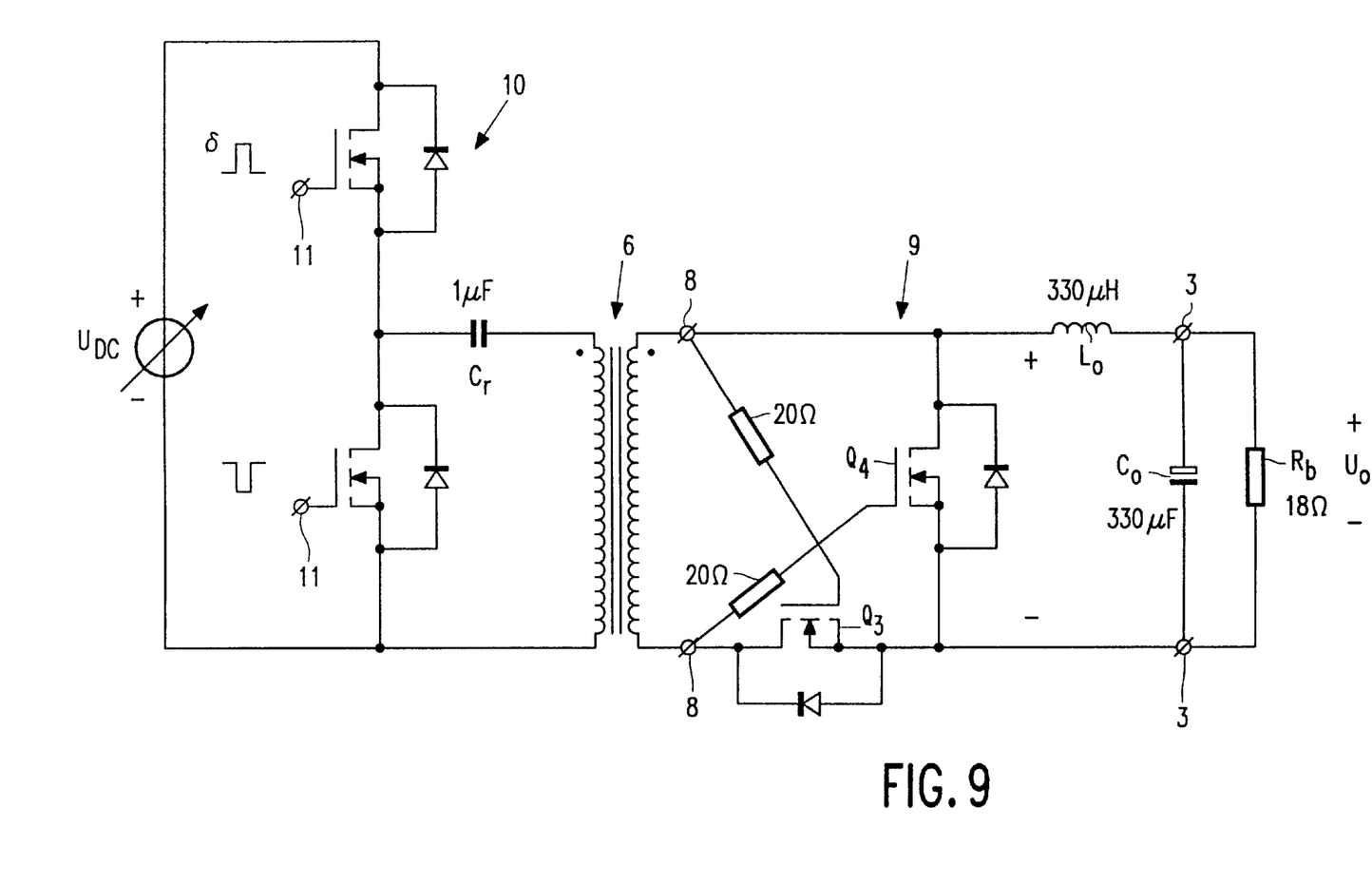

FIG. 9 shows an embodiment which has a very small number of separate components realizing a very efficient voltage transformation in miniature planar technology as described above, the transformation ratio being 4:1.

Figure 10:
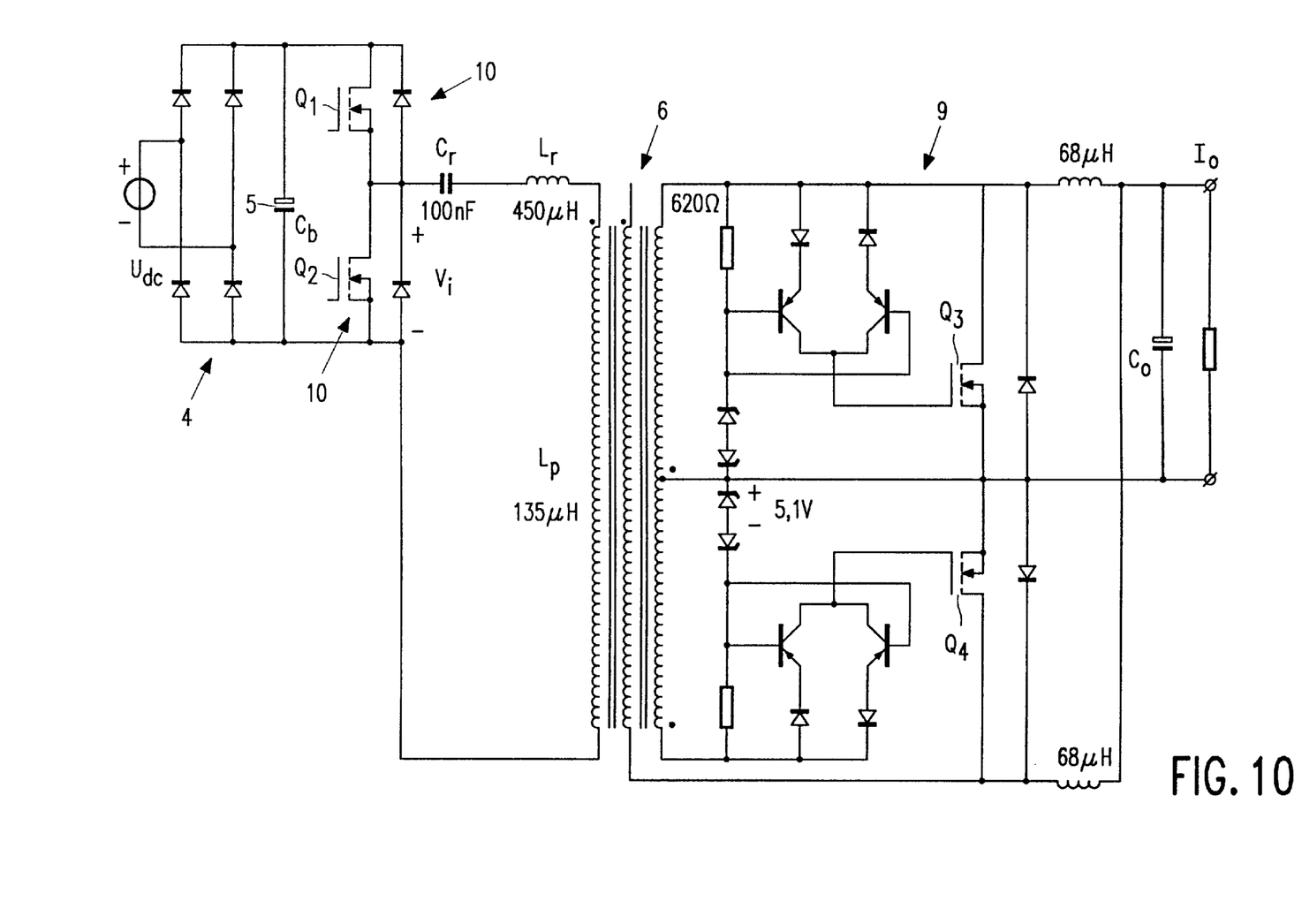
Figure 11:
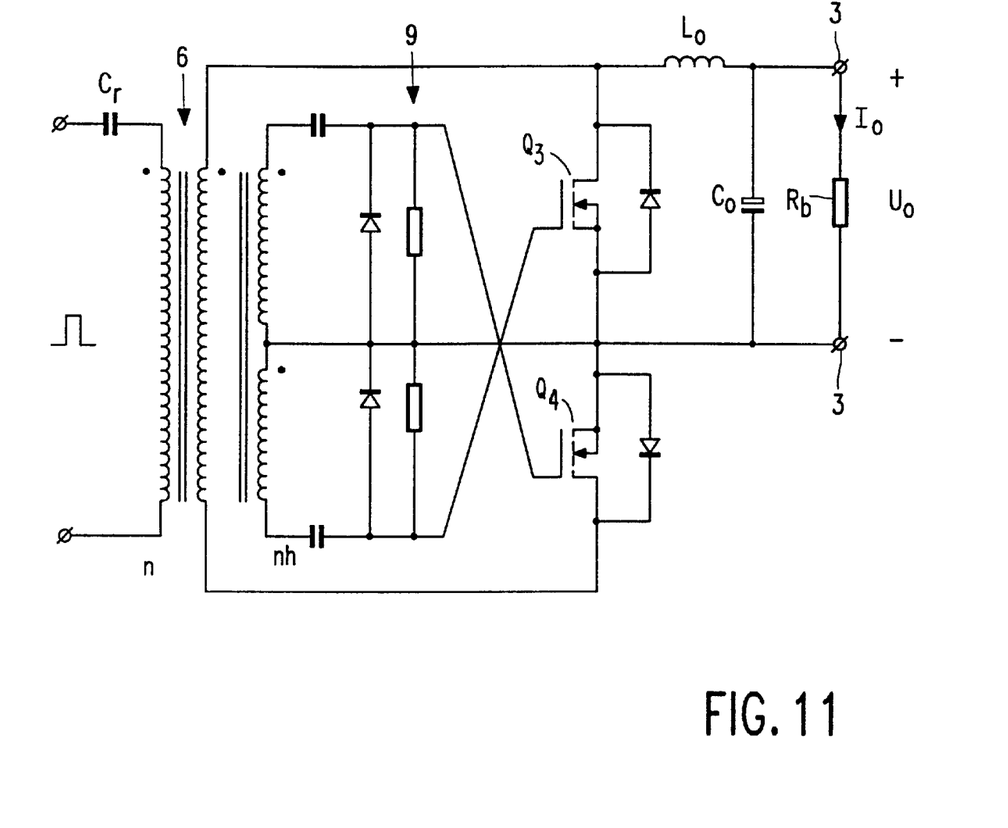

Still further self-driven embodiments, in particular, of the output synchronous rectifier circuit 9 are outlined in FIGS. 10 and 11. For accurate control of the input/output 12 of the rectifier circuit 9, these resonant transformer means 6 are each provided with an additional transducer coupling 14 with central tap 18, or with separate couplings 14-1 and 14-2 for self-driving the active rectifier circuits 9 in a way described hereinabove.

I claim:

1. A power converter having an input and a load output, the converter comprising a resonant transformer having a transformer input and a transformer output coupled to the load output via an output synchronous rectifier circuit comprising at least two transistor switches, each connected between a different end of the transformer output and a same end of the load output, a controllable pulse providing circuit coupled between the input of the converter and the transformer input, the controllable pulse providing circuit being controlled in response to a control signal at a control input of the pulse providing circuit, which control signal is derived from a signal equal or proportional to a signal at the transformer output.

2. The converter according to claim 1, further comprising an LC circuit coupled between the pulse providing circuit and the transformer input.

3. The converter according to claim 1, wherein the resonant transformer is embodied as a resonant miniature transformer.

4. The converter according to claim 1, wherein the resonant transformer is a planar resonant transformer.

5. The converter according to claim 1, wherein the resonant transformer is a piezo-electric resonant transformer.

6. The converter according to claim 1, wherein the output rectifier circuit has a control output from which the control signal is derived.

7. The converter according to claim 6, further comprising a loop filter connected between the control output of the output rectifier circuit and the control input of the pulse providing circuit.

8. The converter according to claim 6, wherein the transistor switches are self-driven from the transformer output.

9. The converter according to claim 1, wherein the synchronous rectifier is a half-wave or full-wave rectifier.

10. A power supply provided with the converter according to claim 1.

11. A battery charger provided with the converter according to claim 1.

12. A converter according to claim 2, wherein the resonant transformer is embodied as a resonant miniature transformer.

13. The converter according to claim 2, wherein the resonant transformer is a planar resonant transformer.

14. The converter according to claim 3, wherein the resonant transformer is a planar resonant transformer.

* * * * *